United States Patent
Perkins

[11] 3,943,618
[45] Mar. 16, 1976

[54] METHOD OF ASSEMBLY OF A DUAL-WALLED PIPE

[75] Inventor: Thomas K. Perkins, Dallas, Tex.

[73] Assignee: Atlantic Richfield Company, Los Angeles, Calif.

[22] Filed: Dec. 30, 1974

[21] Appl. No.: 537,355

[52] U.S. Cl. .............. 29/407; 285/47; 285/133 A; 285/392; 285/93; 29/445; 29/455 R
[51] Int. Cl.² .......................................... B23Q 17/00
[58] Field of Search ...... 285/47, 133 R, 133 A, 134, 285/175, 392, 138, 140, 93; 29/455, 445, 407

[56] References Cited
UNITED STATES PATENTS

| 572,124 | 12/1896 | McElroy | 285/48 X |
| 724,675 | 4/1903 | Decker | 285/133 R |
| 861,828 | 7/1907 | Grindrod et al. | 285/175 |
| 3,778,089 | 12/1974 | Fredd | 285/392 X |
| 3,870,346 | 3/1975 | Kappeler et al. | 285/47 |

FOREIGN PATENTS OR APPLICATIONS
26,890  8/1912  U.S.S.R. ......................... 285/133 R

*Primary Examiner*—Werner H. Schroeder
*Assistant Examiner*—Wayne L. Shedd
*Attorney, Agent, or Firm*—Roderick W. MacDonald

[57] ABSTRACT

A method for assembling two pipes into a single section of double-walled, radially-spaced, concentric pipe of sufficient strength for use in a wellbore in a permafrost zone in the earth is disclosed. Connectors having both left-hand and right-hand and internal and external threads connect corresponding internal and external threads on the pipe. Marks on the pipe ends indicate the various thread start points and, in combination with the left-hand and right-hand threads, permits proper alignment of the threads and facilitate threaded assembly of the two pipes into the double-walled section of pipe. Standard sizes of pipe may be used.

3 Claims, 7 Drawing Figures

METHOD OF ASSEMBLY OF A DUAL-WALLED PIPE

BACKGROUND OF THE INVENTION

Heretofore, in the production of warm fluids such as petroleum gas and/or petroleum liquid from a wellbore in the earth through a permafrost zone whereby part of the permafrost could be melted upon continued exposure to heat from the warm fluid, it has been proposed to employ double-walled pipes to provide thermal insulation between the warm fluid passing through the well and the permafrost in the wall of the well. A good background reference in this area is U.S. Pat. No. 3,680,631, the disclosure of which is incorporated herein by reference.

It has been proposed to use a diaphragm connection means which is very small in size,e.g., e.g, one-sixteenth inch in thickness, to minimize the heat loss through this connector since the connector does provide a metallic contact between the inner and outer pipes of the assembly. However, such a thin connector is weak and has a disadvantage of providing a nonrigid assembly. A nonrigid assembly is more prone to damage and even failure during handling, installation, and/or use in the well because the connection can plastically deform under the stresses that normally accompany such activities.

It has now been found that connector means of sufficient size and strength to form an essentially rigid assembly which will not plastically deform under the normal stresses to which the assembly is subjected can be employed without intolerable heat loss.

SUMMARY OF THE INVENTION

According to this invention, there is provided an assembly of inner and outer pipes which is essentially rigid, i.e., its connector means will not plastically deform under normal stresses, and which is quite rigid compared to an assembly using a thin diaphragm connector means. By this invention, the inner and outer pipes are rigidly joined to one another at their opposing ends in the annulus between the pipes by use of annular connector means of a sufficient overall length, i.e., at least one-half inch up to about four inches, to provide a connection which can withstand the force requirements to which the assembly is to be subjected during handling, installation, and use in the well. The connector means can be installed by way of threads, welding, a combination of threads and welding, and any other known means for connecting pipes so long as the connecting medium, i.e., the weld, threads, etc., are of sufficient magnitude to provide a connection which will not plastically deform under normal stresses.

This invention also provides an assembling method whereby the connector means are threaded on both their inner and outer sides and thereby join the inner and outer pipes by means of threads. According to this embodiment of the invention, one of the pipes to be connected has threads of opposite rotational direction on its opposing ends, i.e., one end of the pipe has right-hand threads and the other end of the pipe has left-hand threads. One connector means is threaded onto one pipe and the other connector means is threaded onto the opposite end of the other pipe and the assembly is then made by inserting one pipe into the other with the connector means at opposite ends of the assembly and rotating one of the pipes to start threading that pipe's connector means onto the other pipe. The connector means on the other pipe, because it is on threads of opposite rotational direction, can be rotated in the same direction as the first pipe. This connector means then moves longitudinally toward the first pipe. This connector means can also be moved relative to the first pipe so that the thread start points on this connector means and the first pipe can be lined up with a minor degree of rotation of both the first pipe and the connector means. Of course, if necessary, this connector means can be rotated in the opposite direction of the first pipe thereby moving the connector means longitudinally away from the first pipe. After the connector means is thus adjusted so that the thread start points on the connector means and the first pipe are lined up, the assembly can be completed by simply stopping rotation of this connector means and continuing rotation of the first pipe which is then making up the threads between both connector means.

Accordingly, it is an object of this invention to provide a new and improved method and apparatus for producing wells through a permafrost zone. It is another object to provide a new and improved method and apparatus for thermally insulating pipe in a wellbore. It is another object to provide a new and improved method and apparatus for producing hot fluid through permafrost without substantially melting the permafrost. It is another object to provide a new and improved method and apparatus for thermally insulating at least part of a wellbore in a manner wherein the insulating assemblies are sufficiently rigid and strong to withstand normal handling, emplacement, and use in the wellbore.

Other aspects, objects and advantages of this invention will be apparent to those skilled in the art from this disclosure and the appended claims.

DETAILED DESCRIPTION OF THE INVENTION

Figure 1:
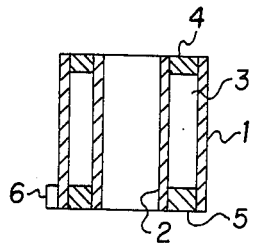
FIG. 1 shows a cross section of an assembly according to this invention.

More specifically, FIG. 1 shows a first or outer pipe 1 with a concentric, spaced apart inner pipe 2 thereby defining annulus 3, the pipes being rigidly maintained in this spaced apart relation by means of connector means 4 and 5. Each connector means 4 and 5 having a thickness 6 of at least one-half inch and preferably not substantially greater than four inches so that the assembly as shown in FIG. 1 is rigid and will not plastically deform even at the connection zones between the pipes and the connector means or in the connector means themselves under the normal stresses to which the assembly is subjected during fabrication, transportation, storage, emplacement in the well, and use of the assembly in the well.

Figure 2:
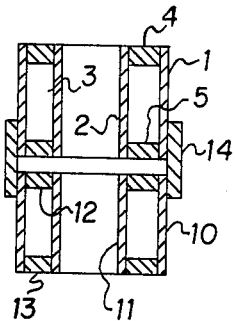
FIG. 2 shows two assemblies according to this invention joined by a conventional coupling (collar).

FIG. 2 shows the assembly of FIG. 1 joined to another assembly composed of outer and inner pipes 10 and 11, respectively, which are rigidly fixed to one another at their opposing ends by means of connector means 12 and 13. The two assemblies are joined together by means of collar 14.

FIG. 2 shows how the two assemblies would appear in the wellbore itself. A plurality of these assemblies can be used in a wellbore, particularly in the permafrost zone thereof. The permafrost zone of the wellbore can contain a continuous string of these double-walled assemblies or a mixture of a double-walled and conventional single-walled pipe as desired.

Figure 3:
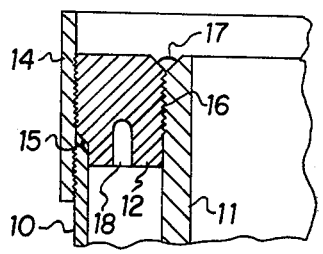
FIG. 3 shows a cross section of a portion of an assembly according to this invention and shows in greater detail the connector means between the two pipes and the collar.

FIG. 3 shows connector means 12 to be joined to outer pipe 10 by way of weld 15 and to be joined to inner pipe 11 by way of threads 16, the threads being sealed in a pressure sealed manner by way of a small weld 17. Connector means 12 also has a hollowed-out portion 18 which is annular in configuration and provides some thermal insulation to cut down the heat transfer between pipes 11 and 10 by way of coupling 14. Space 18 can also contain solid thermal insulation if desired.

Figure 4:
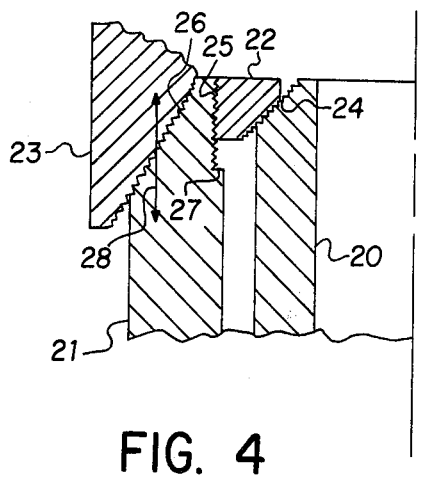
FIG. 4 shows a cross section of another embodiment of this invention wherein tapered threads are employed.

FIG. 4 shows another embodiment wherein inner pipe 20 and outer pipe 21 are connected by way of connector means 22 in a threaded manner, outer pipe 21 having a collar 23 also threaded thereto. Threads 24 between outer surface of pipe 20 and the inner surface of connector means 22 are tapered whereas threads 25 between the inner surface of pipe 21 and the outer surface of connector means 22 are straight. Threads 26 between the outer surface of pipe 21 and collar 23 are also tapered which is conventional for oil well pipe and collars. In the normal straight thread 25, a shoulder 27 is left because of the way threads are conventionally cut. Such a shoulder is absent when using tapered threads 24. Inner pipe 20 is subjected to high stresses. The tapered threads 24 provide maximum strength in the connection and eliminate a shoulder such as 27 which can be a stress concentrator. Shoulder 27 is not a problem stress concentrator because of the tapered threads 26. The stresses between pipe 21 and collar 23 pass as shown by arrow 28, thereby bypassing shoulder 27.

Figure 5:
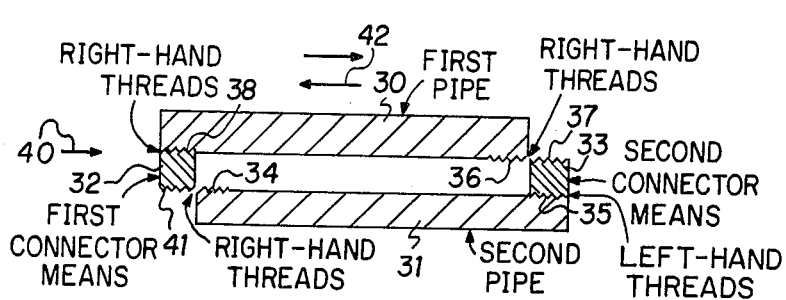
FIG. 5 shows a cross section of two pipes and their associated connector means when being assembled in accordance with one embodiment of the method of this invention.

FIG. 5 shows a cross section through the top part of two pipes. First (outer) pipe 30 and second (inner) pipe 31 each have associated therewith a connector means, i.e., first connector means 32 being associated with first pipe 30 and second connector means 33 being associated with second pipe 31. Initially, first connector means 32 is threaded onto first pipe 30 and second connector means 33 is threaded onto second pipe 31.

According to one embodiment of the method of this invention, second pipe 31 has threads of opposite rotational direction at its opposing ends, i.e., right-handed threads at 34 and left-handed threads at 35. Of course, they could be reversed if desired, i.e., left-hand threads at 34 and right-hand threads at 35, so long as the threads on the opposing ends of the pipe are of opposite rotational direction. Thus, the threads on the inner surface of second connector means 33 which are adjacent threads 35 are left-hand threads. Since threads 34 are right-hand threads, threads 36 and 37 on pipe 30 and second connector means 33, respectively, which threads 36 and 37 will be adjacent one another, are right-hand threads. The threads between the outer surface of first connector means 32 and the inner surface of pipe 30, which threads are also adjacent one another, and the threads at 38 can all be either right-handed or left-handed threads but are preferably right-handed so that the only threads of opposite rotational direction in the assembly are those at 35.

Thus, when inner second pipe 31 is inserted into outer first pipe 30 and first pipe 30 and first connector means 32 both rotated clockwise (looking in the direction of arrow 40) to start threads 41 meshing with threads 34, threads 36 and 37 will also start making up if their thread start points are lined up.

According to this invention, threads 36 and 37 are mated while threads 41 and 34 are being engaged by rotating second connector means 33 until the start point of threads 37 lines up with the start point of threads 36. Since second connector means 33 will be rotating on left-hand threads 35, clockwise movement of second connector means 33, i.e., rotation in the same direction as outer first pipe 30, will cause second connector means 33 to move longitudinally, i.e., parallel to the long axes of pipes 30 and 31 toward first pipe 30, i.e., in the direction of arrow 42, thereby moving threads 36 and 37 toward one another.

Figure 6:
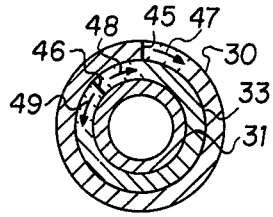
FIG. 6 shows an end view of the elements of FIG. 5.

A primary advantage of this embodiment of the invention is that the thread start points of threads 36 and 37 move through only a small degree of rotation before mating because they are being moved toward one another rather than one having to catch up with the other. This is better seen by way of FIG. 6 which shows a cross section through pipes 30 and 31 and second connector means 33, the cross section being viewed in the direction of arrow 40 of FIG. 5. Assume the start point for threads 36 on first pipe 30 is mark 45 and the start point for threads 37 on second connector means 33 is at mark 46. Since outer pipe 30 is rotating clockwise, i.e., in the direction of arrow 47, second connector means 33 can be rotated in the same counterclockwise direction as shown by arrow 48 thereby moving second connector means 33 toward outer pipe 30 and by rotating second connector means 33 faster relative to first pipe 30, thread start point 46 can be moved toward thread start point 45 at the same time second connector means 33 is moved toward first pipe 30. When start marks 45 and 46 are lined up then the movement of second connector means 33 is terminated and continued rotation of first pipe 30 will cause makeup of both sets of threads, i.e., thread set 41 and 34 and thread set 36 and 37. If it is necessary to move second connector means 33 away from first pipe 30 because first pipe 30 is going to abut second connector means 33 before the thread start marks 45 and 46 can be lined up, then second connector means 33 can be rotated in the opposite or counterclockwise direction as shown by arrow 49.

Thus, by use of the opposite rotational direction threads at 35 the threads on the connector means and pipes can be randomly cut and pipes 30 and 31 need not be of the exact same length because differences due to randomly cut threads and pipe lengths can be adjusted for by adjustment of second connector means 33.

Thread 38 can be right-hand or left-hand in the embodiment of FIG. 5, it not mattering which because first connector means 32 and first pipe 30 are fitted to one another and move together in the assemblying method of this invention. Also, right-hand threads 41, 34, 36 and 37 could be left-hand threads in which case threads 35 would then be right-hand threads.

Figure 7:
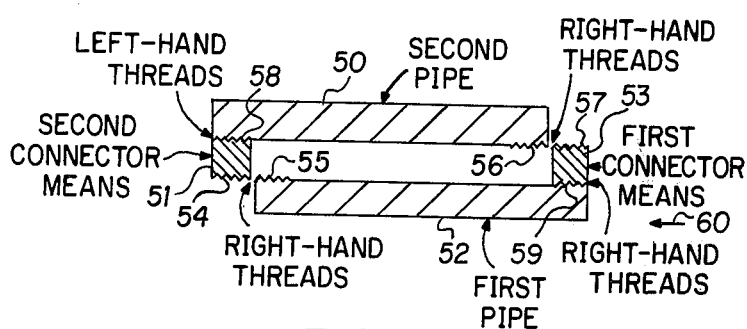
FIG. 7 shows a cross section of pipes and their associated connector means when being assembled in accordance with another embodiment of this invention.

As shown in FIG. 7, the preferred approach of all the threads being right-hand threads except one set can be maintained but transferred to the outer pipe. In FIG. 7 outer second pipe 50 has associated therewith second connector means 51 and inner first pipe 52 has associated therewith first connector means 53. Threads 54 and 55 and threads 56 and 57 are all right-hand threads while threads 58 between second connector means 51 and outer second pipe 50 are left-hand threads. Threads 59 between first connector means 53 and first pipe 52 can be right-hand or left-hand threads but are preferably right-hand threads since the majority of the other threads in the assembly are right-hand. Thus, the only opposite directional rotating threads are 58 and, in this situation, inner first pipe 52 is rotated clockwise when viewing in the direction of arrow 60 to mate threads 56 and 57 and second conductor means 51 is adjusted on its left-hand threads 58 by rotation in the same clockwise direction as first pipe 52 and first connector means 53 to bring second connector means 51 toward first pipe 52 and to align the thread start points of threads 54 and 55. After alignment of these thread start points second connector means 51 can be fixed in place and continued rotation of first pipe 52 and first connector means 53 causes continued makeup between threads 54 and 55 and between threads 56 and 57 at the same time. Similarly, threads 54, 55, 56 and 57 could all be left-hand threads in which case threads 58 would be right-hand threads, it still not mattering whether threads 59 are left- or right-hand threads.

The annulus between the inner and outer pipes such as annulus 3 can simply be an air space or can contain gaseous, liquid and/or solid thermal insulation or even a vacuum. The seal means to hold a vacuum, gas, etc., can be any known seal such as weld 17, or an epoxy seal, or any of innumerable mechanical seals such as O-rings, etc. Additionally, when emplacing a string of assemblies such as that shown in FIG. 2 in a wellbore, a thermal insulating material of the solid type can be employed about each collar 14 to prevent heat loss such as is shown in U.S. Pat. No. 3,680,631. Other thermal insulating material can be placed outside the assembly such as a specially designed packer fluid, for example that disclosed in U.S. Pat. No. 3,827,978, or a gaseous and/or liquid material which will carry off heat before it reaches the permafrost such as that disclosed in U.S. Pat. No. 3,662,832, the disclosures of both patents being incorporated herein by reference.

Reasonable variations and modifications are possible within the scope of this disclosure without departing from the spirit and scope of this invention.

The embodiments of the invention in which an exclusive property or privilege is claimed are defined as follows:

1. A method for making a double-walled pipe assembly for use in a permafrost zone in a wellbore comprising providing two sections of pipe which fit together concentrically to provide an annulus therebetween, the inside pipe being threaded at both ends on its outside wall, the outside pipe being threaded at both ends on its inside wall, providing first and second annular connecting means which are threaded on their inner and outer walls, threading the first connecting means onto a first of said pipes, threading the second connecting means onto the second pipe, said second pipe having threads of opposite rotational directions at either end so that when said first pipe and said first connector means are assembled with said second pipe said second connector means can be rotated relative to said first pipe thereby moving said second connector means longitudinally toward or away from said first pipe and lining up thread start points on said second connector means and first pipe, rotating said first pipe and first connector means together to thread said first connector means onto said second pipe, rotating said second connector means relative to said first pipe until the thread start points on said first pipe line up with the thread start points on said second connector means, stopping the rotation of said second connector means, and continuing rotation of said first pipe and first connector means so that said second connector means threads onto said first pipe at the same time said first pipe threads onto said second connector means.

2. A method according to claim 1 wherein said second pipe is the inner pipe and has right-hand threads adjacent said first connector means and left-hand threads adjacent said second connector means, and said second pipe is the outer pipe and has right-hand threads adjacent both connector means so that as said outer pipe is rotated to thread its first connector means onto said inside pipe said second connector means on the inner pipe is rotated relative to said outer pipe to move said second connector means in a longitudinal direction and to line up the thread start points on said outer pipe and second connector means.

3. A method according to claim 1 wherein said second pipe is the outer pipe and has right-hand threads adjacent said first connector means and left-hand threads adjacent said second connector means, and said first pipe is the inner pipe and has right-hand threads adjacent both connector means so that as said inner pipe is rotated to thread its first connector means onto said outside pipe said second connector means can be rotated relative to said inner pipe to move said second connector means in a longitudinal direction and to line up the thread start points on said inner pipe and second connector means.

* * * * *